(12) United States Patent
Pach et al.

(10) Patent No.: US 10,435,304 B2
(45) Date of Patent: Oct. 8, 2019

(54) PROCESS FOR MAKING AMMONIA

(71) Applicant: JOHNSON MATTHEY PUBLIC LIMITED COMPANY, London (GB)

(72) Inventors: John David Pach, Billingham (GB); Daniel Sheldon, Billingham (GB); David Wails, Billingham (GB)

(73) Assignee: Johnson Matthey Public Limited Company, London, England (GB)

( * ) Notice: Subject to any disclaimer, the term of this patent is extended or adjusted under 35 U.S.C. 154(b) by 93 days.

(21) Appl. No.: 15/541,406

(22) PCT Filed: Jan. 11, 2016

(86) PCT No.: PCT/GB2016/050060
§ 371 (c)(1),
(2) Date: Jul. 3, 2017

(87) PCT Pub. No.: WO2016/124886
PCT Pub. Date: Aug. 11, 2016

(65) Prior Publication Data
US 2018/0002185 A1    Jan. 4, 2018

(30) Foreign Application Priority Data
Feb. 5, 2015 (GB) .................................. 1501952.4

(51) Int. Cl.
*C01C 1/04* (2006.01)
*B01J 23/89* (2006.01)
(Continued)

(52) U.S. Cl.
CPC ............. *C01C 1/0488* (2013.01); *B01J 23/56* (2013.01); *B01J 23/8906* (2013.01);
(Continued)

(58) Field of Classification Search
CPC .. C01B 2203/068; C01C 1/0488; C07C 29/50
See application file for complete search history.

(56) References Cited

U.S. PATENT DOCUMENTS 3,088,919 A  5/1963 Brown et al.
3,310,376 A * 3/1967 Cook ...................... C01B 3/025
423/359
(Continued)

FOREIGN PATENT DOCUMENTS

EP    1 059 118 A2    12/2000
EP    2 554 512 A1    2/2013
(Continued)

OTHER PUBLICATIONS

Komova et al. "Methanol Formation in the Water Gas Shift Reaction over Copper-Containing Catalysts", Catalysis in Industry, 2009, vol. 1, No. 4, pp. 300-305. (Year: 2009).*
(Continued)

*Primary Examiner* — Amber R Orlando
*Assistant Examiner* — Syed T Iqbal
(74) *Attorney, Agent, or Firm* — BakerHostetler

(57) ABSTRACT

A process for production of ammonia includes: providing a reaction stream including carbon monoxide and hydrogen; passing the reaction stream and steam over a water gas shift catalyst in a catalytic shift reactor, forming a shifted gas mixture depleted in carbon monoxide and enriched in hydrogen; passing the shifted gas mixture with an oxygen-containing gas over a selective oxidation catalyst at ≥175° C., forming a selectively oxidized gas stream with a portion of the carbon monoxide converted to carbon dioxide; removing some of the carbon dioxide from the selectively oxidized gas stream in a carbon dioxide removal unit; passing the carbon dioxide depleted stream over a methanation catalyst in a methanator to form a methanated gas stream, optionally adjusting its hydrogen:nitrogen molar ratio to form an ammonia synthesis gas; and passing the ammonia synthesis gas over an ammonia synthesis catalyst in an ammonia converter to form ammonia.

14 Claims, 2 Drawing Sheets

Figure 1:
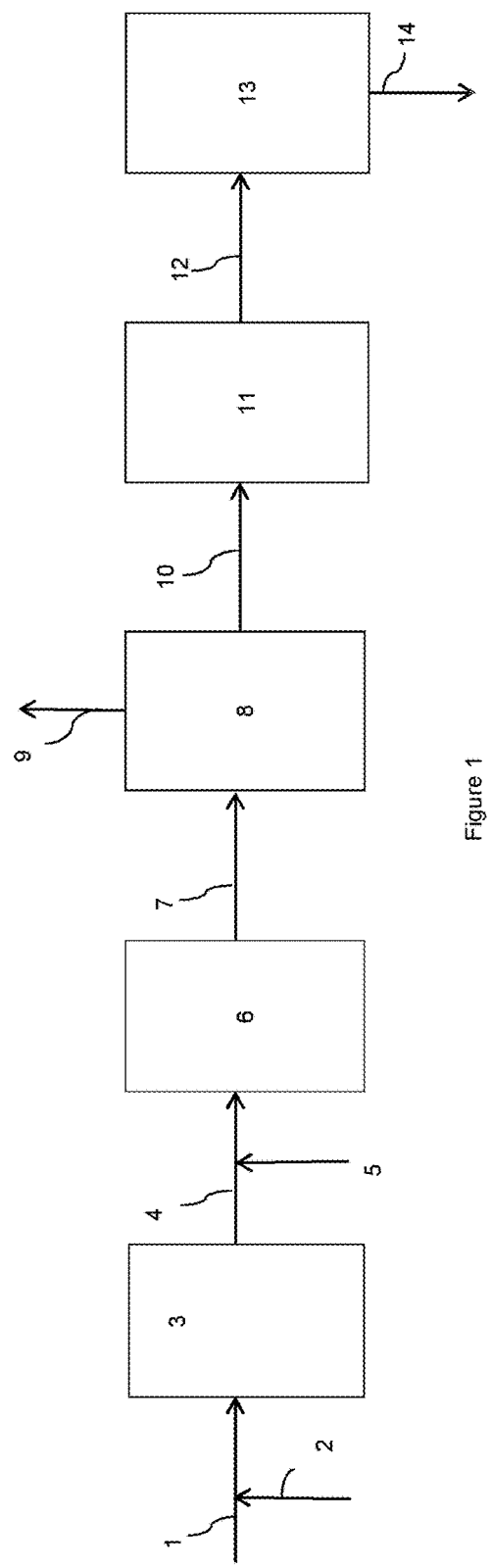

(51) Int. Cl.
*C01B 3/02* (2006.01)
*B01J 23/56* (2006.01)

(52) U.S. Cl.
CPC ........... *B01J 23/8953* (2013.01); *C01B 3/025* (2013.01); *C01C 1/0411* (2013.01); *C01B 2203/025* (2013.01); *C01B 2203/0233* (2013.01); *C01B 2203/0244* (2013.01); *C01B 2203/0283* (2013.01); *C01B 2203/044* (2013.01); *C01B 2203/047* (2013.01); *C01B 2203/048* (2013.01); *C01B 2203/0475* (2013.01); *C01B 2203/068* (2013.01); *C01B 2203/1058* (2013.01); *C01B 2203/1076* (2013.01); *Y02C 10/06* (2013.01); *Y02C 10/08* (2013.01); *Y02P 20/52* (2015.11)

(56) References Cited

U.S. PATENT DOCUMENTS

| | | | | |
|---|---|---|---|---|
| 4,238,468 | A | * | 12/1980 | Bonacci .................. C01B 3/025 423/359 |
| 6,485,853 | B1 | * | 11/2002 | Pettit .................... H01M 8/0612 429/412 |
| 6,627,572 | B1 | | 9/2003 | Cai et al. |
| 2002/0119087 | A1 | * | 8/2002 | Menacherry ............. C10K 3/04 423/247 |
| 2006/0276332 | A1 | * | 12/2006 | Shore ...................... B01J 23/89 502/326 |
| 2011/0101279 | A1 | * | 5/2011 | Schiodt .................. B01J 23/002 252/373 |

FOREIGN PATENT DOCUMENTS

| | | |
|---|---|---|
| GB | 1 116 585 A | 11/1965 |
| GB | 2 028 786 A | 3/1980 |
| JP | H11 43304 A | 2/1999 |
| JP | 2005-353347 A | 12/2005 |
| WO | 2006/130574 A1 | 12/2006 |
| WO | 2010/000387 A1 | 1/2010 |
| WO | 2013/095130 A1 | 6/2013 |
| WO | 2014/187621 A1 | 11/2014 |

OTHER PUBLICATIONS

Great Britain Combined Search and Examination Report issued in Application No. GB1600455.8, dated Jul. 28, 2016.
Great Britain Search Report issued in Application No. GB1501952.4, dated Aug. 21, 2015.
International Search Report, dated Mar. 31, 2016, from corresponding PCT/GB2016/050060 application.

* cited by examiner

PROCESS FOR MAKING AMMONIA

The present invention relates to a process for the production of ammonia.

Since ammonia is used in a large number of processes including the production of pharmaceuticals, dyes, fertilizers, plastics, and the like it is important that the process for its production enables it to be provided in sufficient volume and at low cost.

Conventionally, ammonia is produced by the Haber-Bosch process in which hydrogen and nitrogen are reacted at high pressure. Typically the hydrogen is obtained by steam reforming a hydrocarbon feedstock such as natural gas in a process known as primary reforming to produce a stream comprising un-reacted hydrocarbon, hydrogen, carbon dioxide and carbon monoxide. Nitrogen may be provided from a number of sources but often is provided by secondary reforming the product of primary reforming with air to produce a raw synthesis gas. A catalytic water-gas shift conversion is then used to convert at least some of the carbon monoxide to carbon dioxide and form additional hydrogen. The carbon dioxide can then be removed. The remaining stream is subjected to catalytic methanation to convert residual amounts of carbon monoxide and carbon dioxide to methane. The stream from the methanator, which will primarily consist of hydrogen and nitrogen, with trace amounts of methane, is then compressed and passed to the ammonia reactor in which the hydrogen is reacted with the nitrogen to form ammonia.

A modification of this general process was proposed in U.S. Pat. No. 3,088,919 in which the stream from the shift converter is cooled and saturated with water, heated to a temperature of around 110° C., and then passed to a reactor in which the residual carbon monoxide is selectively reacted with oxygen to form carbon dioxide. A modification of this selective oxidation process is described in GB1116585 where an alternative catalyst is proposed for the oxidation. It has been generally recognised that the temperature of the selective oxidation stage is important. If a low temperature is used, the reaction is kinetically limited. However, this has been accepted since it was believed that if higher temperatures were used, poor selectivity would be achieved and an unacceptable oxidation of hydrogen in the gas stream would be observed. Thus in prior art arrangements, selective oxidation is carried out at temperatures of about 110° C. or below.

GB2028786 discloses an ammonia manufacturing in which a normally gaseous hydrocarbon or a vaporized naphtha is steam reformed and shift converted, in the presence of air to produce a relatively hot water vapor-containing gaseous stream containing nitrogen and hydrogen in substantially stoichiometric proportion for the production of ammonia along with carbon dioxide and with minor amounts of carbon monoxide. The hot gaseous mixture is then cooled to remove water vapor therefrom as water, and oxygen, usually in the form of air, is added to the resulting cooled gaseous mixture which is contacted with a catalyst for the selective oxidation of the carbon monoxide therein to carbon dioxide in the presence of hydrogen. The resulting gases are then treated for the removal of carbon dioxide and optionally to methanation then contacted with a catalyst under high pressure and at an elevated temperature for the conversion of the nitrogen and hydrogen in the treated gases to ammonia.

Whilst the processes of these prior art arrangements provide an effective route to ammonia, there is a need to provide an alternative, and preferably an improved, process.

In general, an improved process will be one in which productivity is improved and/or costs are reduced. It has now surprisingly been found that where the selective oxidation reaction is carried out at a temperature of about 175° C. or above, an enhanced reduction in carbon monoxide content is obtained without loss of hydrogen. This reduced carbon monoxide content improves the overall process efficiency which will lead, in turn, to increased ammonia output.

Thus according to the present invention, there is provided a process for the production of ammonia comprising the steps of:

(a) providing a reaction stream comprising carbon monoxide and hydrogen;
(b) passing the reaction stream and steam over a water gas shift catalyst in a catalytic shift reactor to form a shifted gas mixture;
(c) passing the shifted gas mixture with an oxygen-containing gas over a selective oxidation catalyst at an inlet temperature $\geq 175°$ C. to form a selectively oxidised gas stream;
(d) removing at least a portion of the carbon dioxide from the selectively oxidised gas stream in a carbon dioxide removal unit;
(e) passing the carbon dioxide depleted stream over a methanation catalyst in a methanator to form a methanated gas stream,
(f) optionally adjusting the hydrogen:nitrogen molar ratio of the methanated gas stream to form an ammonia synthesis gas; and
(g) passing the ammonia synthesis gas over an ammonia synthesis catalyst in an ammonia converter to form ammonia.

The use of the selective oxidation catalyst to convert at least a portion of the carbon monoxide in the shifted gas stream to carbon dioxide offers advantages over simply allowing it to be removed by reaction in a methanator. This is because if the carbon monoxide is converted to methane, there is a requirement for hydrogen, which reduces the ammonia production capacity of the process. Thus the use of the selective oxidation catalyst reduces the hydrogen consumption in any subsequent methanator thereby ensuring that the hydrogen is available for use in ammonia production. Furthermore, in contrast to the aforesaid GB2028786, in the present invention the shifted gas mixture, without steps of cooling to condense steam and separation of water, is fed to the selective oxidation catalyst. Thus the shifted gas is passed without water removal to the selective oxidation catalyst. The Applicants have found surprisingly that water removal from the shifted gas mixture is not required and that any methanol formed over the water-gas shift catalyst may be advantageously decomposed over the selective oxidation catalyst at the higher inlet temperatures. This advantageously removes the need for cooling, separating water, re-heating the shifted gas and water treatment of methanol-containing water.

It has surprisingly been found that using an inlet temperature of $\geq 175°$ C. provides an improved conversion of the carbon monoxide to carbon dioxide. In one arrangement an inlet temperature in the range 175° C. to about 250° C. may be used. Inlet, temperatures in the range 180° C. to about 220° C. may be used and inlet temperatures in the range 190° C. to about 210° C. may offer some advantages. It will be understood that the reaction to form carbon dioxide in the selective oxidation reactor is an exothermic reaction. Since the selective oxidation reactor may be operated adiabatically, it will be understood that with these inlet temperatures, the reaction may occur at from about 175° C. to about 350°

C. Alternatively, the selective oxidation reaction may be operated with cooling applied to the selective oxidation catalyst bed, for example by heat exchange with boiling water under pressure, such that the selective oxidation is operated isothermally.

A further benefit of the present invention is that since the stream is fed to the selective oxidation catalyst at a temperature of from about 175° C., it can be fed directly from the catalytic shift reactor without requiring the cooling and subsequent heating which is needed in prior art processes. Thus, the costs associated with the temperature adjustment are avoided. The heat generated in the selective oxidation, is preferably recovered for example using a downstream heat exchanger. Since this recovered heat will not generally be required for the temperature adjustment of the stream from the catalytic shift reactor, it can be utilised elsewhere in the process scheme. Where the temperature rise in the selective oxidation catalyst is around 40° C., the energy recovered will be in the region of 4 MW. This may, for example, be recovered into the plant steam system rather than being lost to cooling water.

The selective oxidation catalyst of the present invention will not generally be exposed to high levels of carbon monoxide because of the upstream water-gas shift stage, therefore protection measures to deal with high exotherm temperature rises are not generally required. However, if high temperature rises are observed, this may readily be addressed by temporarily reducing or stopping the flow of oxygen containing gas to the selective oxidation catalyst. Proceeding in this way will have no adverse impact on downstream processes.

The selective oxidation may be carried out at any suitable pressure. The pressure selected may depend on the temperature required. Generally, pressures in the region of from about 10 to about 80 bar absolute may be used. Pressures of from about 20 to about 45 bar absolute may offer some advantages.

Any suitable selective oxidation catalyst may be used. In one arrangement, a supported platinum group metal catalyst may be used. Suitable supports include alumina, titania, zirconia, ceria, silica and mixtures thereof. Alumina supports are preferred. Platinum is the preferred platinum group metal. One or more transition metal oxide promoters may also be included. Suitable transition metal promoters include iron, cobalt, nickel and manganese. The catalyst may comprise from 1-10% wt platinum group metal and from 0.1-1% wt transition metal. A particularly suitable selective oxidation catalyst comprises 1-5% wt platinum and about 0.1-1.0% wt iron, expressed as $Fe_2O_3$, supported on an alumina support. The catalysts are available commercially or may be prepared by applying solutions or washcoats comprising the platinum group metal and transition metal to the support.

The oxygen containing gas passed to the selective oxidation catalyst may be air, oxygen-enriched air or oxygen. Whilst oxygen does not have problems associated with contaminants found in air, its use will generally increase the costs of the process. The oxygen containing gas may be added to the shifted gas mixture before it is added to the selective oxidation catalyst. The oxygen containing gas enables the carbon monoxide to be oxidised to form carbon dioxide. In addition, a proportion of the hydrogen present may be oxidised to water. There will desirably be selectivity ≥50%, more preferably ≥52%, to the oxidation of carbon monoxide.

The selective oxidation catalyst may be disposed in a selective oxidation reactor downstream of the catalytic shift reactor. However, in another arrangement, the selective oxidation and the catalytic water-gas shift catalysts are disposed within one vessel. It will be understood that the catalyst beds for the respective parts of the combined reactor are desirably kept separate and that the oxygen containing gas should only be provided to the selective oxidation part of the combined reactor to prevent undesirable oxidation in the catalytic shift reactor. Thus the invention includes a reaction vessel suitable for performing water gas shift and selective oxidation, comprising an elongate shell having first and second ends, with a process fluid inlet at the first end and a process fluid outlet at the second end, a water-gas shift catalyst disposed near the first end and a selective oxidation catalyst disposed near the second end, a gas impermeable barrier located between the catalysts and connecting means that permit the shifted gas and an oxygen-containing gas to be fed to the selective oxidation catalyst. Cooling apparatus, such as a plurality of heat exchange tubes, may be provided in the water-gas shift catalyst and/or the selective oxidation catalyst. Preferably the reaction vessel is mounted vertically with the water-gas shift catalyst disposed above the selective oxidation catalyst. The catalysts are preferably particulate fixed beds. In one embodiment, a plate is provided between the catalysts to separate them thereby providing a water-gas shift zone and a selective oxidation zone within the reaction vessel. The shifted gas is conveyed between the zones by means of one or more external conduits that recover the shifted gas from the water gas shift zone, pass externally through the shell to the exterior of the reaction vessel, and then convey the shifted gas to the selective oxidation zone. The external conduits permit heat exchange with the shifted gas stream. Furthermore the oxygen-containing gas for the selective oxidation may be supplied to one or more of such conduits.

The reaction stream, which may be termed raw synthesis gas, comprising carbon monoxide and hydrogen provided in step (a) may be formed by any suitable means. The synthesis gas generation may be based on steam reforming of a hydrocarbon such as natural gas, naphtha or a refinery off-gas; or by the gasification of a carbonaceous feedstock, such as coal or biomass. Preferably the syngas generation stage comprises steam reforming a hydrocarbon. This may be achieved by primary reforming a hydrocarbon with steam in externally-heated catalyst-filled tubes in a fired- or gas-heated steam reformer and, where the methane content of the primary reformed gas is high, secondary reforming the primary-reformed gas mixture in a secondary reformer, by subjecting it to partial combustion with an oxygen-containing gas and then passing the partially combusted gas mixture through a bed of steam reforming catalyst. The oxygen-containing gas may be air, oxygen or oxygen-enriched air. Whereas secondary reforming with air or oxygen-enriched air usefully provides the nitrogen in the reaction stream, the synthesis gas may be produced by primary steam reforming or autothermally reforming a hydrocarbon feed using oxygen alone and providing nitrogen from another source, such as an air separation unit (ASU).

The primary reforming catalyst typically comprises nickel at levels in the range 5-30% wt, supported on shaped refractory oxides, such as alpha alumina or magnesium- or calcium aluminates. If desired, catalysts with different nickel contents may be used in different parts of the tubes, for example catalysts with nickel contents in the range 5-15% wt or 30-85% wt may be used advantageously at inlet or exit portions if the tubes. Alternatively, structured catalysts, wherein a nickel or precious metal catalyst is provided as a coated layer on a formed metal or ceramic structure may be used, or the catalysts may be provided in a plurality of containers disposed within the tubes. Steam reforming reactions take place in the tubes over the steam reforming catalyst at temperatures above 350° C. and typically the process fluid exiting the tubes is at a temperature in the range 650-950° C. The heat exchange medium flowing around the outside of the tubes may have a temperature in the range 900-1300° C. The pressure may be in the range 10-80 bar abs. In a secondary reformer, the primary-reformed gas is partially combusted in a burner apparatus mounted usually near the top of the reformer. The partially combusted reformed gas is then passed adiabatically through a bed of a steam reforming catalyst disposed below the burner apparatus, to bring the gas composition towards equilibrium. Heat for the endothermic steam reforming reaction is supplied by the hot, partially combusted reformed gas. As the partially combusted reformed gas contacts the steam reforming catalyst it is cooled by the endothermic steam reforming reaction to temperatures in the range 900-1100° C. The bed of steam reforming catalyst in the secondary reformer typically comprises nickel at levels in the range 5-30% wt, supported on shaped refractory oxides, but layered beds may be used wherein the uppermost catalyst layer comprises a precious metal, such as platinum or rhodium, on a zirconia support. Such steam reforming apparatus and catalysts are commercially available.

Alternatively, the steam reforming may be achieved by passing a mixture of the hydrocarbon and steam through an adiabatic pre-reformer containing a bed of steam reforming catalyst and then passing the pre-reformed gas mixture to an autothermal reformer which operates in the same way as the secondary reformer to produce a gas stream containing hydrogen, carbon oxides and steam. In adiabatic pre-reforming, a mixture of hydrocarbon and steam, typically at a steam to carbon ratio in the range 1-4, is passed at an inlet temperature in the range 300-620° C. to a fixed bed of pelleted nickel-containing pre-reforming catalyst. Such catalysts typically comprise ≥40% wt nickel (expressed as NiO) and may be prepared by co-precipitation of a nickel-containing material with alumina and promoter compounds such as silica and magnesia. Again, the pressure may be in the range 10-80 bar abs. Alternatively, the reaction stream may be formed by gasification of coal, biomass or other carbonaceous material with air using gasification apparatus. In such processes the coal, biomass or other carbonaceous material is heated to high temperatures in the absence of a catalyst to form a crude synthesis gas often containing sulphur contaminants such as hydrogen sulphide, which have to be removed. Gasification of carbonaceous feedstock to produce a syngas may be achieved using known fixed bed, fluidised-bed or entrained-flow gasifiers at temperatures in the range 900-1700° C. and pressures up to 90 bar abs. The crude synthesis gas streams require additional treatments known in the art to remove unwanted sulphur and other contaminants.

In a preferred process, the syngas generation stage comprises primary reforming a hydrocarbon, particularly natural gas, in a fired steam reformer to produce a gas stream comprising hydrogen, carbon monoxide, carbon dioxide and steam, and secondary reforming stage in which the primary reformed gas is further reformed in a secondary reformer using air or oxygen-enriched air to provide a synthesis gas stream comprising hydrogen, carbon oxides and nitrogen.

The reaction gas stream comprising hydrogen, carbon monoxide and steam is subjected to one or more catalytic water-gas shift stages to form a shifted gas mixture depleted in carbon monoxide and enriched in hydrogen by passing the gas mixture at elevated temperature and pressure over a water-gas shift catalyst. Any suitable catalytic shift conversion reactor and catalyst may be used. If insufficient steam is present, steam may be added to the gas stream before it is subjected to the water-gas shift conversion. The reaction may be depicted as follows;

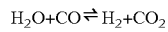

$$H_2O + CO \rightleftharpoons H_2 + CO_2$$

The reaction may be carried out in one or more stages. The, or each, stage may be the same or different and may be selected from a high temperature shift process, a low temperature shift process, a medium temperature shift process and an isothermal shift process.

High temperature shift catalysts may be promoted iron catalysts such as chromia- or alumina-promoted magnetite catalysts. Other high temperature shift catalysts may be used, for example iron/copper/zinc oxide/alumina catalysts, manganese/zinc oxide catalysts or zinc oxide/alumina catalysts. Medium, low temperature and isothermal shift catalysts typically comprise copper, and useful catalysts may comprise varying amounts of copper, zinc oxide and alumina. Alternatively, where sulphur compounds are present in the gas mixture, such as synthesis gas streams obtained by gasification, so-called sour shift catalysts, such as those comprising sulphides of molybdenum and cobalt, are preferred. Such water-gas shift apparatus and catalysts are commercially available.

For high temperature shift catalysts, the temperature in the shift converter may be in the range 300-360° C., for medium temperature shift catalysts the temperature may be in the range 190-300° C. and for low temperature shift catalysts the temperature may be 185-270° C. For sour shift catalysts the temperature may be in the range 200-370° C. The flow-rate of synthesis gas containing steam may be such that the gas hourly space velocity (GHSV) through the bed of water-gas shift catalyst in the reactor may be ≥6000 hour$^{-1}$. The pressure may be in the range 10-80 bar abs.

In a preferred embodiment, the water-gas shift stage comprises a high temperature shift stage or a medium temperature shift stage or an isothermal shift stage with or without a low temperature shift stage.

Where a copper-based catalyst is used, small amounts of methanol may be formed that may end up in process effluent. At the temperatures at which the selective oxidation reactor of the present invention is operated, we have found that methanol present in the shifted gas mixture will be converted to water and hydrogen and carbon dioxide. Thus not only will the contaminating methanol be removed but it can readily be converted to components such that the process efficiency may be further enhanced. Accordingly the invention includes a process for removing methanol from shifted gas mixtures containing methanol, which may be formed over copper-containing low temperature shift catalysts, by passing the shifted gas mixture containing methanol over a selective oxidation catalyst at an inlet temperature ≥175° C., preferably 175° C. to 250° C., more preferably 180° C. to 220° C., most preferably 190° C. to 210° C. Because the methanol oxidation is a side-reaction in the selective oxidation stage, the low-temperature shift catalyst used in the present process is preferably one that produces low-levels of methanol, such as an alkali-metal promoted copper zinc alumina catalyst, such as KATALCO$_{JM}$™ 83-3X.

The shifted gas mixture is subjected to the selective oxidation with an oxygen-containing gas over a selective oxidation catalyst at an inlet temperature ≥175° C. such that at least a portion of the carbon monoxide is converted to carbon dioxide.

The resulting selectively oxidised gas mixture is subjected to a carbon dioxide removal stage. A carbon dioxide removal unit will therefore generally be located between the selective oxidation reactor and the methanator. Any suitable carbon dioxide removal unit may be used. Carbon dioxide removal units may function by reactive absorption, such as those known as aMDEA™ or Benfield™ units that are based on using regenerable amine or potassium carbonate washes, or by physical absorption, based on using methanol, glycol or another liquid at low temperature, such as Rectisol™, Selexol™ units. Carbon dioxide removal may also be performed by pressure-swing adsorption (PSA) using suitable solid adsorbent materials. The carbon dioxide removal unit may also function to simultaneously remove residual steam. Such carbon dioxide removal apparatus and solvents are commercially available. Some or all of the carbon dioxide formed in the shifted and selectively oxidised gas mixture may be removed to produce a gas stream comprising mainly hydrogen and nitrogen with low levels of carbon monoxide. The carbon dioxide removed by the carbon dioxide removal unit may be captured and stored using known carbon capture and storage techniques or it may be used in enhanced oil recovery processes or, less desirably, emitted as effluent from the process. However, in a preferred arrangement, the carbon dioxide is recovered and reacted with a portion of the ammonia to form urea.

In the methanation stage, at least a portion of the residual carbon monoxide and carbon dioxide in the gas mixture are converted to methane over a methanation catalyst in a methanator. Any suitable arrangement for the methanator may be used. Thus the methanator may be operated adiabatically or isothermally. One or more methanators may be used. A nickel-based methanation catalyst may be used. For example, in a single methanation stage the gas from the carbon dioxide removal stage may be fed at an inlet temperature in the range 200-400° C. to a fixed bed of pelleted nickel-containing methanation catalyst. Such catalysts are typically pelleted compositions, comprising 20-40% wt nickel. Such methanation apparatus and catalysts are commercially available. The pressure for methanation may be in the range 10-80 bar abs.

If the synthesis gas has been prepared using air or oxygen-enriched air, the methanated gas stream may be fed to the ammonia production unit as the ammonia synthesis gas. However, if the synthesis gas stream has been prepared without using air or oxygen-enriched air then the hydrogen:nitrogen molar ratio of the methanated gas stream may need to be adjusted, for example by addition of nitrogen from a suitable source, to provide the ammonia synthesis gas. The adjustment of the hydrogen:nitrogen molar ratio is to ensure the ammonia synthesis reaction operates efficiently. The nitrogen may be provided from any source, for example from an air separation unit (ASU). The adjustment may be performed by direct addition of nitrogen to the methanated gas stream. The adjusted gas mixture may then be passed to the ammonia synthesis unit as the ammonia synthesis gas.

The ammonia production unit comprises an ammonia converter containing an ammonia synthesis catalyst. The nitrogen and hydrogen react together over the catalyst to form the ammonia product. Ammonia synthesis catalysts are typically iron based but other ammonia synthesis catalysts may be used. The reactor may operate adiabatically or may be operated isothermally. The catalyst beds may be axial and/or radial flow and one or more beds may be provided within a single converter vessel. The conversion over the catalyst is generally incomplete and so the synthesis gas is typically passed to a loop containing a partially reacted gas mixture recovered from the ammonia converter and the resulting mixture fed to the catalyst. The synthesis gas mixture fed to the loop may have a hydrogen:nitrogen ratio of 2.2-3.2. In the ammonia production unit, the hydrogen/nitrogen mixture may be passed over the ammonia synthesis catalyst at high pressure, e.g. in the range 80-350 bar abs, preferably 150-350 bar abs for large-scale plants, and a temperature in the range 300-540° C., preferably 350-520° C.

A purge gas stream containing methane and hydrogen may be taken from the ammonia synthesis loop and fed to the reaction gas generation step or used as a fuel.

The process of the present invention reduces the amount of contaminants in the gas that is supplied to the ammonia production reactor. This allows the converter to be operated more efficiently with a lower purge flow rate and so less material will be lost via purging than was achievable in prior art arrangements. This further increases the efficiency of the reaction.

The process of the present invention will allow an increased ammonia production. Based on the integration of the selective oxidation into a 1,200 mtpd ammonia synthesis plant with a two-stage reforming front end, the process of the present invention can form approximately an additional 1% ammonia.

Figure 2:
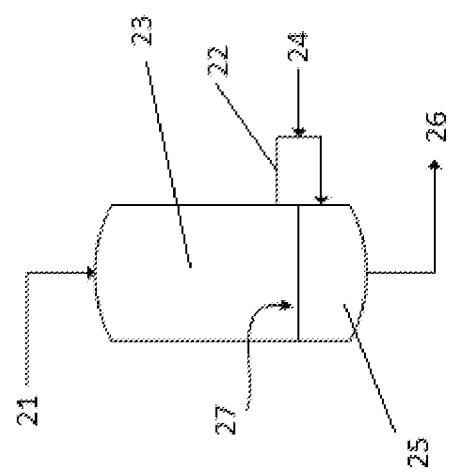

The present invention will now be described by way of example with reference to the following drawings, in which:

FIG. 1 is a schematic representation of one embodiment of the present invention; and FIG. 2 illustrates an integrated water-gas shift converter and selective oxidation unit.

It will be understood by those skilled in the art that the drawings are diagrammatic and that further items of equipment such as reflux drums, pumps, vacuum pumps, temperature sensors, pressure sensors, pressure relief valves, control valves, flow controllers, level controllers, holding tanks, storage tanks, and the like may be required in a commercial plant. The provision of such ancillary items of equipment forms no part of the present invention and is in accordance with conventional chemical engineering practice.

As illustrated in FIG. 1, a reaction gas stream comprising hydrogen, carbon monoxide and nitrogen produced by primary reforming of natural gas and secondary reforming of the primary reformed gas mixture with air, is fed in line 1 to a catalytic water-gas shift reactor 3 containing a water-gas shift catalyst with steam added in line 2. In the embodiment of FIG. 1, the steam 2 is combined with the gas 1 before it enters the catalytic shift reactor 3. This stage is depicted as a single step, but in this embodiment is performed by a high-temperature shift stage and a subsequent low-temperature shift stage at the appropriate inlet temperatures over the appropriate catalysts. A portion of the carbon monoxide present in the reaction gas is converted to carbon dioxide over the water-gas shift catalysts to form a shifted gas mixture depleted in carbon monoxide and enriched in hydrogen. The shifted gas mixture 4 is recovered from the catalytic shift reactor 3. Air is added to the shifted gas mixture in line 5 and the combined stream is passed to the selective oxidation reactor 6. The gas fed to the selective oxidation reactor will be at a temperature of from 175° C. In the selective oxidation reactor 6, the gas mixture is passed over a selective oxidation catalyst comprising 1-5% wt platinum and 0.1-1.0% wt iron, expressed as $Fe_2O_3$. At least a portion of the remaining carbon monoxide is converted into carbon dioxide, forming a carbon monoxide depleted stream. The carbon monoxide depleted stream is then passed in line 7 into the carbon dioxide removal unit 8, in which the carbon dioxide is removed using an absorbent. Carbon dioxide is removed from carbon dioxide removal unit 8 in line 9. This may be stored for reaction with the product ammonia to form urea. The exhaust gas from the carbon dioxide removal unit 8 is then passed in line 10 to the methanator 11, which converts any residual carbon monoxide by reacting it with hydrogen to form methane. The stream removed from the methanator 11 in line 12 has a hydrogen:nitrogen ratio of about 3 and is passed into the ammonia converter 13, where it is used to create ammonia which is recovered in line 14.

FIG. 2 shows an integrated water-gas shift converter and a selective oxidation unit within a single vessel. A water-gas shift section 23 is disposed above an oxidation unit 25 within the vessel and is separated from it by a plate 27. A gas stream 21 comprising hydrogen and carbon monoxide and steam enters the top of the water-gas shift section 23. The carbon monoxide is partially converted over a suitable water-gas shift catalyst before being removed from the water-gas shift section 23 section via line 22. Air 24 is introduced into line 22, before the gas stream is sent back into selective oxidation unit 25. The residual carbon monoxide in the gas stream is further oxidised to form carbon dioxide in the selective oxidation unit 25, before passing out of the integrated apparatus by line 26. The plate 27 is welded in the middle of the apparatus to separate the water-gas shift section 23 and a selective oxidation unit 25, so that the air 24 does not oxidise the catalyst in the water-gas shift section 23.

An ammonia process according to FIG. 1 was modelled to determine the effects of including the selective oxidation process as claimed on a 1200 mtpd ammonia plant fed with a natural gas feed subjected to conventional primary and secondary steam reforming, wherein the water-gas conversion stage was effected by including both high-temperature and low-temperature water gas shift converters without further steam addition.

Gain in Production

|  |  | $N_2$ | $H_2$ | $NH_3$ | $CO_2$ |
|---|---|---|---|---|---|
| Without selective oxidation | kmol/hr | 1591.9 | 4722.1 | 3148.1 | 1197.5 |
| With selective oxidation | kmol/hr | 1604.9 | 4764.0 | 3176.0 | 1208.1 |
| Gain in $NH_3$ | kmol/hr |  |  | 27.9 |  |
| Gain in $CO_2$/urea | kmol/hr |  |  |  | 10.6 |

The process requires an increase in air consumption of 16.5 kmol/hr or 0.83% to maintain the hydrogen:nitrogen ratio of 2.97 in the loop.

The process requires an increase in fuel to the primary reformer to make up for the reduced amount available from the ammonia loop purge of 12.1 kmol/hr and increases demand on the carbon dioxide removal unit by 0.88% for $CO_2$.

The invention may be illustrated by reference to the following examples.

Example 1. Selective Oxidation Catalyst

A solution was prepared using iron (III) nitrate nonahydrate ($Fe(NO_3)_3 \cdot 9H_2O$) and platinum nitrate. The required quantities were mixed together in a citric acid solution. The solution was added to and mixed with a gamma alumina support (SCFa140 available from Sasol) in a volume sufficient to fill the total pore volume of the support. The impregnated support was oven dried and then calcined at 500° C. The calcined catalyst comprised; 3% wt platinum and 0.3% wt iron.

Example 2. Catalyst Testing 0.01 g catalyst powder, ground to 250-355 μm, was mixed with 0.09 g cordierite of the same size distribution. Quartz wool was used to contain the mixture in a quartz reactor tube with a thermocouple monitoring the bed temperature. The following shifted gas composition was used for testing.

| | |
|---|---|
| $CO_2$ | 17.5% |
| $H_2$ | 41.5% |
| CO | 0.6% |
| $O_2$ | 0.6% |
| $N_2$ | 39.8% |

| Stream | 1 | HTS exit | LTS exit | 5 | 7 | 9 | 10 | 12 | 14 |
|---|---|---|---|---|---|---|---|---|---|
| Temp ° C. | 996 | 442 | 228 | 170 | 261 | 35 | 70 | 340 | |
| Pressure bar abs | 34.0 | 32.6 | 31.6 | 31.6 | 31.2 | 1.5 | 29.4 | 29.4 | |
| Flow kmol/hr | 10030.4 | 10030.4 | 10030.4 | 98.5 | 10108.3 | 3803.7 | 6304.6 | 6287.5 | 3184.0 |
| Composition % vol | | | | | | | | | |
| $CH_4$ | 0.32 | 0.32 | 0.32 | 0.00 | 0.31 | 0.00 | 0.50 | 0.64 | 0.10 |
| $CO_2$ | 4.78 | 11.36 | 13.73 | 3.00 | 13.83 | 36.59 | 0.10 | 0.00 | 0.00 |
| CO | 9.18 | 2.60 | 0.23 | 0.00 | 0.02 | 0.00 | 0.04 | 0.00 | 0.00 |
| Ar | 0.18 | 0.18 | 0.18 | 0.93 | 0.19 | 0.00 | 0.30 | 0.30 | 0.05 |
| $H_2$ | 37.23 | 43.80 | 46.17 | 0.00 | 45.62 | 0.25 | 72.99 | 72.68 | 0.00 |
| $N_2$ | 15.10 | 15.10 | 15.10 | 78.08 | 15.75 | 0.05 | 25.22 | 25.29 | 0.05 |
| $O_2$ | 0.00 | 0.00 | 0.00 | 20.96 | 0.00 | 0.00 | 0.00 | 0.00 | 0.00 |
| $H_2O$ | 33.21 | 26.64 | 24.27 | 0.00 | 24.27 | 63.10 | 0.85 | 1.09 | 0.05 |
| $NH_3$ | | | | | | | | | 99.75 |

Gas chromatography was used to monitor gas composition.

The results were as follows;

| Temperature (° C.) | CO Conversion (%) | Selectivity (%) |
|---|---|---|
| 139.7 | 62.8 | 52.0 |
| 150.7 | 72.9 | 51.6 |
| 160.5 | 82.1 | 51.6 |
| 171.6 | 90.3 | 51.2 |
| 183.0 | 95.4 | 50.6 |
| 192.6 | 97.5 | 50.2 |
| 201.4 | 98.4 | 50.2 |
| 211.2 | 98.4 | 49.9 |
| 220.2 | 98.7 | 50.2 |
| 230.4 | 95.6 | 48.4 |
| 242.5 | 93.3 | 47.3 |
| 251.3 | 91.1 | 46.1 |
| 259.9 | 88.2 | 44.6 |
| 271.4 | 83.7 | 42.4 |

There is a clear optimum in terms of carbon monoxide conversion in the region of 200-220° C. whilst maintaining a reasonable selectivity towards carbon monoxide.

The invention claimed is:

1. A process for producing ammonia, comprising the steps of:
   (a) passing a reaction stream comprising (i) carbon monoxide, (ii) hydrogen, and (iii) steam over a copper-based water gas shift catalyst in a catalytic shift reactor to form a shifted gas mixture containing methanol;
   (b) without steps of cooling to condense steam to water and separating the condensed water, passing the shifted gas mixture with an oxygen-containing gas over a selective oxidation catalyst at an inlet temperature in a range of from 175° C. to 250° C. to form a selectively oxidised gas stream;
   (c) removing at least a portion of the carbon dioxide and steam from the selectively oxidised gas stream in a carbon dioxide removal unit;
   (d) passing the carbon dioxide depleted stream over a methanation catalyst in a methanator to form a methanated gas stream, and
   (e) passing the methanated gas stream over an ammonia synthesis catalyst in an ammonia converter to form ammonia.

2. The process of claim 1, wherein the inlet temperature is in the range of from 180° C. to 220° C.

3. The process of claim 1, wherein step (b) is performed adiabatically in the range of from about 175° C. to about 350° C.

4. The process of claim 1, wherein step (b) is performed isothermally.

5. The process of claim 1, wherein step (b) is carried out at a pressure in the range of from 10 to 80 bar absolute.

6. The process of claim 1, wherein the selective oxidation catalyst is a supported platinum group metal catalyst.

7. The process of claim 6, wherein the selective oxidation catalyst comprises 1 to 5% wt platinum and 0.1 to 1.0% wt iron, expressed as $Fe_2O_3$.

8. The process of claim 1, wherein the selective oxidation and the catalytic water-gas shift catalysts are disposed within one vessel.

9. The process of claim 1, wherein the water gas shift catalyst is an alkali-promoted copper-zinc oxide alumina water gas shift catalyst.

10. The process of claim 1, wherein the reaction stream in step (a) is formed by pre-reforming and/or primary steam reforming, and secondary or autothermal reforming a hydrocarbon feedstock with oxygen, air or oxygen-enriched air.

11. The process of claim 1, wherein steam is added to the reaction stream before it is subjected to the catalytic water-gas shift conversion.

12. The process of claim 1, wherein the carbon dioxide removal unit is an absorption unit or a pressure swing adsorption unit.

13. The process of claim 1, wherein carbon dioxide removed in the carbon dioxide removal unit is reacted with product ammonia to form urea.

14. The process of claim 1, further comprising adjusting the hydrogen:nitrogen molar ratio of the methanated gas stream to form an ammonia synthesis gas and passing the ammonia synthesis gas over an ammonia synthesis catalyst in an ammonia converter to form the ammonia.

* * * * *